(12) United States Patent
Lee

(10) Patent No.: US 9,398,830 B2
(45) Date of Patent: Jul. 26, 2016

(54) BASE FOR FOOD MIXER

(71) Applicant: Wen Ching Lee, Taichung (TW)

(72) Inventor: Wen Ching Lee, Taichung (TW)

( * ) Notice: Subject to any disclaimer, the term of this patent is extended or adjusted under 35 U.S.C. 154(b) by 73 days.

(21) Appl. No.: 13/621,900

(22) Filed: Sep. 18, 2012

(65) Prior Publication Data

US 2014/0078855 A1   Mar. 20, 2014

(51) Int. Cl.
*A47J 43/046* (2006.01)
*A47J 43/07* (2006.01)

(52) U.S. Cl.
CPC ............ *A47J 43/046* (2013.01); *A47J 43/0716* (2013.01)

(58) Field of Classification Search
CPC ............ B01F 15/00474; A47J 43/0716; A47J 43/046; A47J 43/0733; A47J 43/085
USPC ............................. 366/206, 142, 205, 601, 197
See application file for complete search history.

(56) References Cited

U.S. PATENT DOCUMENTS

| | | | | |
|---|---|---|---|---|
| 2,671,191 A | * | 3/1954 | Braski | 318/272 |
| 2,740,029 A | * | 3/1956 | Kueser et al. | 338/126 |
| 4,885,917 A | * | 12/1989 | Spector | 62/343 |
| 4,893,942 A | * | 1/1990 | Stottmann | 366/279 |
| 5,323,973 A | * | 6/1994 | Ferrara, Jr. | 241/37.5 |
| 6,629,492 B1 | * | 10/2003 | Li | 99/337 |
| 7,318,666 B1 | * | 1/2008 | Lin | 366/206 |
| 7,882,734 B2 | * | 2/2011 | Ciancimino et al. | 73/169 |
| 2009/0067279 A1 | * | 3/2009 | Mulle et al. | 366/142 |
| 2010/0188343 A1 | * | 7/2010 | Bach | 345/173 |
| 2010/0246319 A1 | * | 9/2010 | Pryor et al. | 366/205 |
| 2011/0222367 A1 | * | 9/2011 | Allen | 366/206 |

OTHER PUBLICATIONS

Spectra Symbol website, www.spectrasymbol.com/potentiometer/softpot, accessed Dec. 4, 2014 from the Wayback Machine internet archive.*

* cited by examiner

*Primary Examiner* — Charles Cooley
*Assistant Examiner* — Marc C Howell
(74) *Attorney, Agent, or Firm* — Muncy, Geissler, Olds & Lowe, P.C.

(57) ABSTRACT

A base for a food mixer includes a body in which a motor is mounted. The base further includes a control unit having a first touch control panel and a processor. The first touch control panel is mounted to a first side of the body. The first touch control panel includes a sliding section. A finger of a user is adapted to slide from an end towards the other end of the sliding section, producing a sliding signal indicative of a sliding distance and a sliding direction of the finger of the user. The processor is in direct or indirect electrical connection with the motor and the first touch control panel. The processor receives the sliding signal and includes a motor control program. The processor changes a speed of the motor according to the sliding signal due to sliding of the finger of the user alone the sliding section.

14 Claims, 4 Drawing Sheets

BASE FOR FOOD MIXER

BACKGROUND OF THE INVENTION

The present invention relates to a rood mixer and, more particularly, to a base for a food mixer.

A food mixer generally includes a container and a base. A cutter is mounted in a bottom of the container. A motor is mounted in the motor and is electrically connected to the cutter. A touch control panel is provided on a face of the base, allowing a user to control the speed or rotation mode of the motor by touching the touch control panel. However, the user has to repeatedly touch the touch control panel for increasing or reducing the speed of the motor. The speed of the motor is either too fast or too slow during operation, leading to inconvenience to use.

BRIEF SUMMARY OF THE INVENTION

To overcome the disadvantages of the prior art. the present invention provides a base for a food mixer. The base includes a body in which a motor is mounted. The base further includes a control unit having a first touch control panel and a processor. The first touch control panel is mounted to a first side of the body. The first touch control panel includes a sliding section. A finger of a user is adapted to slide from an end towards the other end of the sliding section, producing a sliding signal indicative of a sliding distance and a sliding direction of the finger of the user. The processor is in direct or indirect electrical connection with the motor and the first touch control panel. The processor receives the sliding signal and includes a motor control program. The processor changes a speed of the motor according to the sliding signal due to sliding of the finger of the user along the sliding section.

Preferably, a second touch control panel is mounted in a top side of the base and is electrically connected to the control unit. The second touch control panel is adapted to be touched by the finger of the user to control on/off of the control unit.

Preferably, a groove is defined in a second side of the base opposite to the first side of the base. A power connector is mounted in the groove.

Preferably, the groove includes top and bottom walls and a lateral wall extending between the top and bottom walls. The lateral wall includes a through-hole in communication with an interior of the base. The power connector includes a power cord and a plug. The power cord extends through the through-hole and has an end connected to the plug. Two columns are mounted in the groove, with each column having an upper end connected to the top wall and a lower end connected to the bottom wall, with the two columns spaced from each other.

Preferably, a bulge extends upward and outward from the first side of the base.

Preferably, the bulge includes a chamber having an opening in a top of the bulge, with the first touch control panel received in the opening.

The present invention will become clearer in light of the following detailed description of illustrative embodiments of this invention described in connection with the drawings.

DETAILED DESCRIPTION OF THE INVENTION

Figure 1:
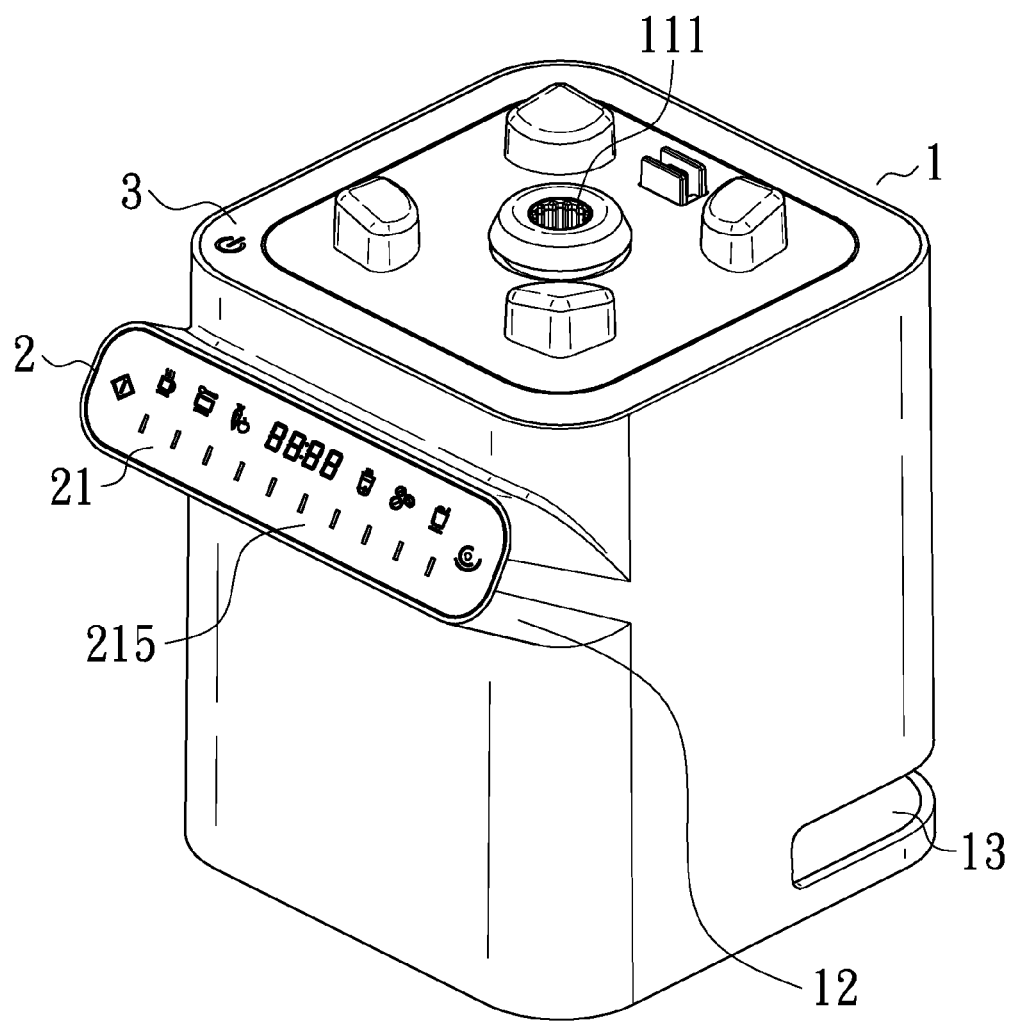
FIG. 1 shows a perspective view of a food mixer according to the present invention.
Figure 4:
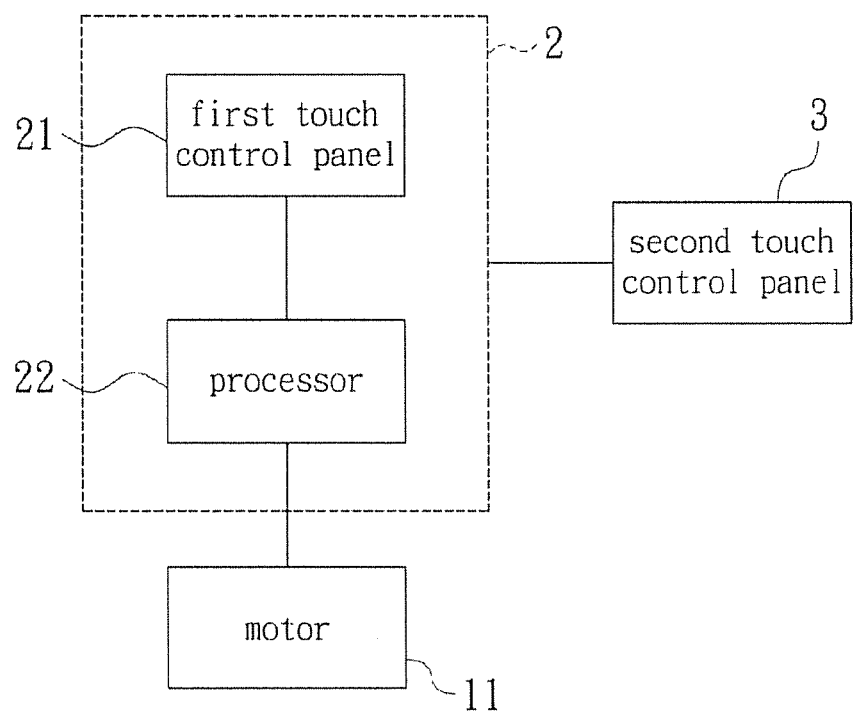
FIG. 4 shows a schematic block diagram illustrating electrical connection of some components of the food mixer of FIG. 1.

With reference to FIGS. 1 and 4, a base for a food mixer according to the present invention includes a body 1 in which a motor 11 is mounted. A driving member 111 is connected to a shaft of the motor 11 and is exposed on a top side of the base 1. The driving member 111 is adapted to couple with and drive a cutter in a container of the food mixer, which can be appreciated by one skilled in the art.

Figure 2:
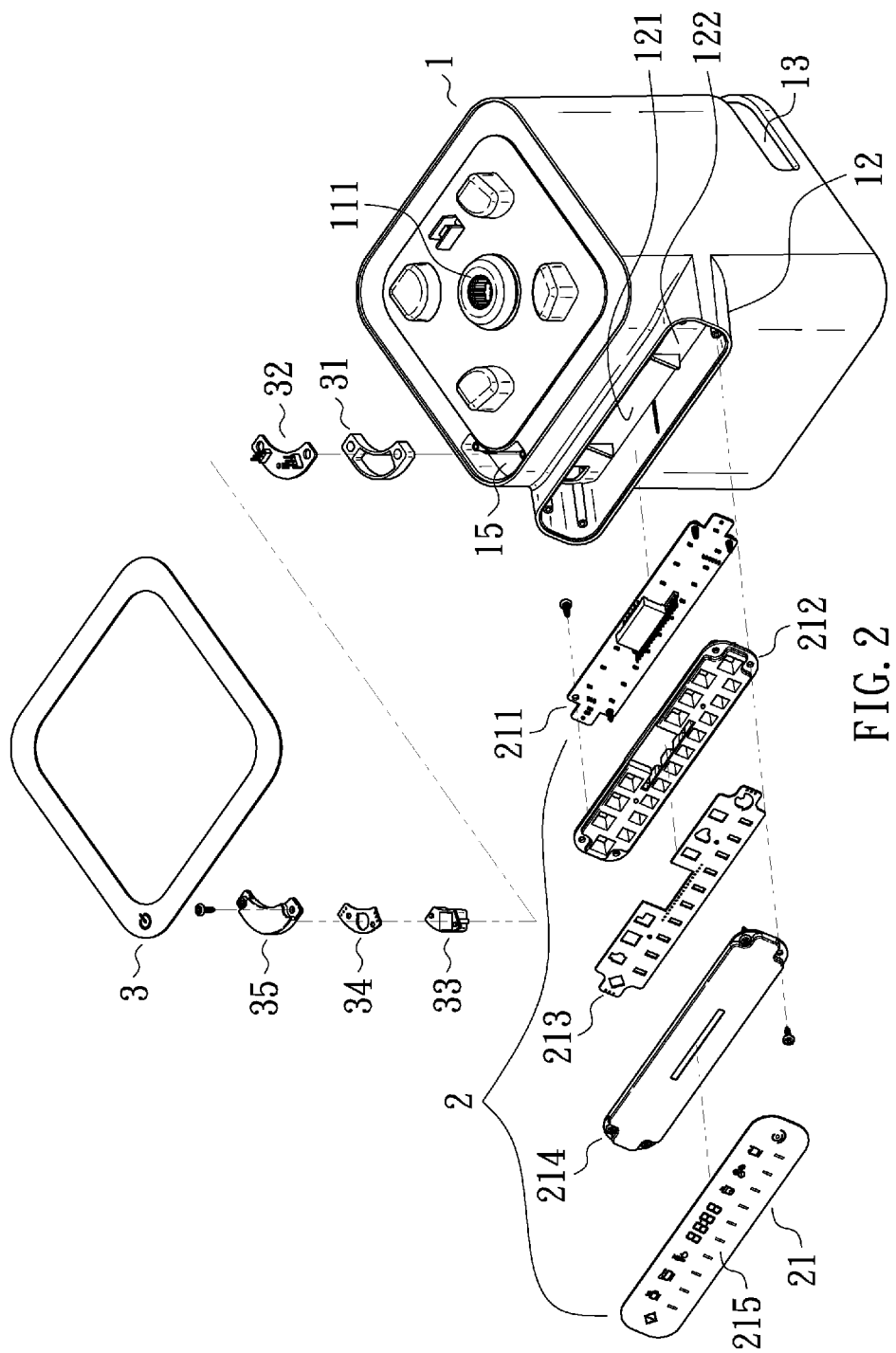
FIG. 2 shows an exploded, perspective view of the food mixer of FIG. 1.

With reference to FIG. 2, a bulge 12 extends upward and outward from a first side of the base 1. Preferably, the bulge 12 includes a chamber 121 having an opening 122 in a top of the bulge 12 for receiving a control unit 2. Since the bulge 12 extends upward and outward, the top of the bulge 12 faces the eyes of a user, allowing easy control by the user.

Figure 3:
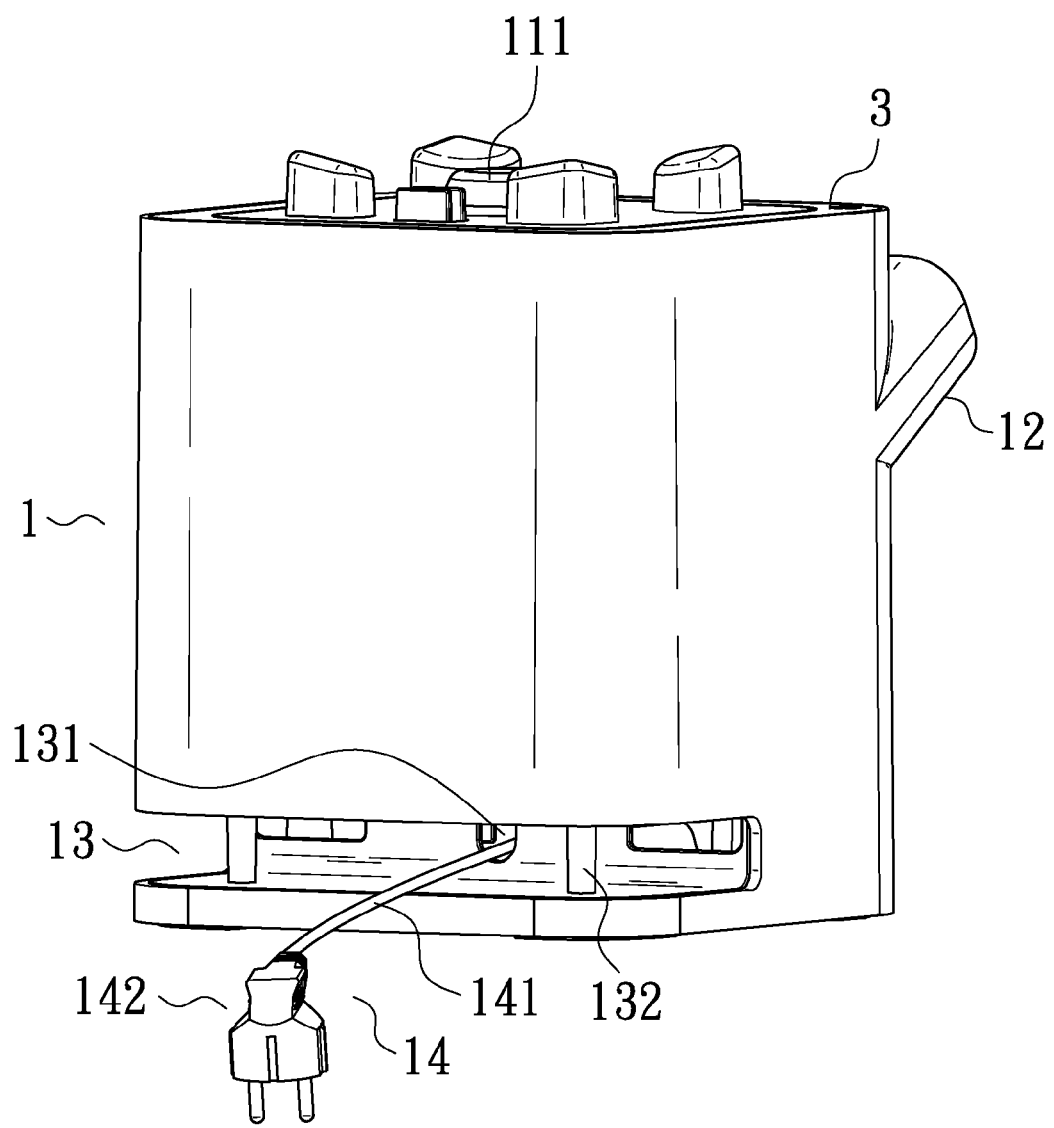
FIG. 3 shows a rear view of the food mixer of FIG. 1.

With reference to FIG. 3, the base 1 further includes a second side opposite to the first side. A groove 13 is defined in the second side, and a power connector 14 is mounted in the groove 13. The groove 13 includes top and bottom walls and a lateral wall extending between the top and bottom walls. The lateral wall includes a through-hole 131 in communication with an interior of the base 1. The power connector 14 includes a power cord 141 and a plug 142. The power cord 141 extends through the through-hole 131 and has an end connected to the plug 142. Two columns 132 are mounted in the groove 13, with each column 132 having an upper end connected to the top wall and a lower end connected to the bottom wall, with the two columns 132 spaced from each other. The power cord 141 and the plug 142 can be received in the groove 13, avoiding exposure of the power connector 14 and, thus, allowing easy storage of the base. The power cord 141 can be wound around the columns 132, avoiding entangling of the power cord 141 received in the groove 13.

With reference to FIGS. 1 and 2, the control unit 2 includes a first touch control panel 21 and a processor 22. The first touch control panel 12 is mounted to the top of the bulge 12. The first touch control panel 21 includes a sliding section 215 having two ends. A finger of the user can slide from one of the two ends towards the other end of the sliding section 215, producing a sliding signal indicative of a sliding distance and a sliding direction of the finger of the user.

The control unit 2 further includes an LED circuit hoard 211, a light-transmission frame 212, a touch control circuit hoard 213, and a shield 214 that are received in the chamber 121 in sequence. The patterns on the first touch control panel 21 transmit light to allow easy operation by the user. The operation, connection, and functions of the components received in the chamber 121 can be appreciated by one having ordinary skill in the art.

With reference to FIGS. 1 and 4, the processor 22 is in direct or indirect electrical connection with the motor 11 and the first touch control panel 21. The processor 22 receives the sliding signal. The processor 22 includes a motor control program. When the finger of the user slides along the sliding section 215, the processor 22 changes the speed of the motor 22 according to the sliding signal.

As an example, when the finger of the user touches the sliding section 215 and slides rightwards, the speed of the motor 11 gradually increases under control by the processor 22. When the finger reaches the right end of the sliding section 215, the speed of the motor 11 is the fastest. When the finger of the user touches the sliding section 215 and slides leftwards, the speed of the motor 11 gradually decreases under control by the processor 22. The motor 11 stops when the finger reaches the left end of the sliding section 215. Thus, operation of the food mixer is easy to the user.

With reference to FIGS. 1 and 2, a second touch control panel 3 is mounted on the top side of the base 1. As can be seen from FIG. 2, the top side of the base 1 includes a recessed portion 15 in which a waterproof member 31, an LED circuit hoard 32, a light-transmission frame 33, a touch control circuit board 34, and a shield 35 are received in sequence. The operation, connection, and functions of the components received in the recessed portion 15 can be appreciated by one having ordinary skill in the art.

The second touch control panel 3 is electrically connected to the control unit 2. The user can touch the second touch control panel 3 to control on/off of the control unit 2.

Although specific embodiments have been illustrated and described, numerous modifications and variations are still possible without departing from the essence of the invention. The scope of the invention is limited by the accompanying claims.

The invention claimed is:

1. A base for a food mixer, with the base comprising:
   a body defining sides, with a motor mounted in the body;
   a bulge extending outwardly and upwardly between two sides of the body to define a chamber external to the first side, the bulge terminating at an open end in communication with the chamber; and
   a control unit disposed in the chamber of the bulge and including a first touch control panel, an LED display, and a processor, wherein the first touch control panel is mounted at the open end of the bulge to remain raised away from the first side of the body, the first touch control panel including a sliding section defining a touch sensitive portion between two ends, the touch control unit being responsive to a finger of a user sliding along the touch sensitive portion of the sliding section to produce a sliding signal indicative of a sliding distance and a sliding direction of the finger of the user, the first touch control panel being at least partially light transmissive and disposed in stacked relation over the LED display within the chamber to transmit indicative light from the underlying LED display through the first touch control panel;
   wherein the processor in direct or indirect electrical connection with the motor and the first touch control panel, the processor receiving the sliding signal, and executing a motor control program, for responsively changing a speed of the motor in gradual manner according to the continual sliding of the finger of the user along the sliding section and said two sides defining a distance therebetween, wherein the bulge is rectangular and has a dimension substantially equal to said distance.

2. The base for a food mixer as claimed in claim 1, wherein the base includes a top side, the base further comprising a second touch control panel mounted on the top side of the base, the second touch control panel electrically connected to the control unit, the second touch control panel adapted to be touched by the finger of the user to control on/off of the control unit.

3. The base for a food mixer as claimed in claim 1, wherein the base further includes a second side opposite to the first side of the base, a groove formed at the second side of the base, and a power connector mounted in the groove.

4. The base for a food mixer as claimed in claim 3, wherein the groove includes top and bottom walls and a lateral wall extending between the top and bottom walls, the lateral wall including a through-hole in communication with an interior of the base, the power connector including a power cord and a plug, the power cord extending through the through-hole and having an end connected to the plug, two columns mounted in the groove, each of the two columns having an upper end connected to the top wall and a lower end connected to the bottom wall, the two columns spaced from each other.

5. The base for a food mixer as claimed in claim 1, wherein the base further comprising a second touch control panel electrically connected to the control unit and mounted on a surface of the base displaced from the bulge and offset in planar orientation from the first touch panel.

6. The base for a food mixer as claimed in claim 1, wherein the base includes a top side, and a second touch control panel is mounted on a peripheral surface of the top side, wherein the second touch control panel is electrically connected to the control unit and actuates responsive to finger touch of the user to control on/off of the control unit.

7. A base for a food mixer comprising:
   a body defining sides including a motor mounted in the body;
   a control unit contained in a rectangular bulge including a first touch control panel, an LED display, and a processor, wherein the first touch control panel is mounted at the LED display, the first touch control panel including a sliding section defining a touch sensitive portion between two ends, the first touch control unit being responsive to a finger of a user sliding along the touch sensitive portion of the sliding section to produce a sliding signal indicative of a sliding distance and a sliding direction of the finger of the user, the LED display includes an LED circuit board, a light-transmission frame, a touch control circuit board, and a shield, the LED circuit board, the light-transmission frame, the touch control circuit board and the shield are disposed in a stacked sequence relationship, the first touch control panel being at least partially light transmissive and disposed in a stacked relationship over the shield of the LED display to transmit indicative light from the underlying LED circuit board of the LED display through the first touch control panel;
   wherein the processor is in direct or indirect electrical connection with the motor and the first touch control panel, the processor receiving the sliding signal, and executing a motor control program for responsively changing a speed of the motor in a gradual manner according to the continual sliding of the finger of the user along the sliding section, wherein the bulge has a dimension substantially equal to the distance between two sides of the body.

8. The base for a food mixer as claimed in claim 7, wherein the base includes a top side, the base further comprising a second touch control panel mounted on the top side of the base, the second touch control panel electrically connected to the control unit, the second touch control panel adapted to be touched by the finger of the user to control on/off of the control unit.

9. The base for a food mixer as claimed in claim 7, wherein the base further includes a second side opposite to the first side of the base, a groove formed at the second side of the base, and a power connector mounted in the groove.

10. The base for a food mixer as claimed in claim 9, wherein the groove includes top and bottom walls and a lateral wall extending between the top and bottom walls, the lateral wall including a through-hole in communication with an interior of the base, the power connector including a power cord and a plug, the power cord extending through the through-hole and having an end connected to the plug, two columns mounted in the groove, each of the two columns having an upper end connected to the top wall and a lower end connected to the bottom wall, the two columns spaced from each other.

11. The base for a food mixer as claimed in claim 7, wherein the base further comprises a second touch control panel electrically connected to the control unit and mounted on a surface of the base displaced from the bulge and offset in planar orientation fron e first touch panel.

12. The base for a food mixer as claimed in claim 7, wherein the base includes a top side, and a second touch control panel is mounted on a peripheral surface of the top side, wherein the second touch control panel is electrically connected to the control unit and actuates responsive to finger touch of the user to control on/off of the control unit.

13. The base for a food mixer as claimed in claim 7, wherein the bulge extends outwardly and upwardly from a first side of the body, the first touch control panel is located at a top of the bulge.

14. The base for a food mixer as claimed in claim 13, wherein the bulge includes a chamber and an opening, the opening being formed at a top of the bulge and communicating with the chamber, the control unit disposed in the chamber of the bulge, the first touch control panel is located at the opening of the bulge.

\* \* \* \* \*